US012661677B1

(12) United States Patent
Lawergren

(10) Patent No.: US 12,661,677 B1
(45) Date of Patent: Jun. 23, 2026

(54) BUCKET CLAW

(71) Applicant: Craig Lawergren, Erie, PA (US)

(72) Inventor: Craig Lawergren, Erie, PA (US)

(*) Notice: Subject to any disclaimer, the term of this patent is extended or adjusted under 35 U.S.C. 154(b) by 409 days.

(21) Appl. No.: 16/539,821

(22) Filed: Aug. 13, 2019

(51) Int. Cl.
B05B 15/628 (2018.01)
B65D 25/20 (2006.01)
F16M 13/02 (2006.01)

(52) U.S. Cl.
CPC ............ B05B 15/628 (2018.02); B65D 25/20 (2013.01); F16M 13/022 (2013.01)

(58) Field of Classification Search
CPC ...... B05B 15/628; B65D 25/22; B65D 25/20; F16M 13/022; A47L 13/512; B44D 3/123
USPC .................................................. 220/735, 736
See application file for complete search history.

(56) References Cited

U.S. PATENT DOCUMENTS

| | | | | |
|---|---|---|---|---|
| 1,170,414 A | * | 2/1916 | Christensen | A62C 13/78 |
| | | | | 248/312.1 |
| 3,531,073 A | * | 9/1970 | Cortina | B44D 3/123 |
| | | | | 248/113 |
| 5,377,863 A | * | 1/1995 | Widman | B65D 25/32 |
| | | | | 220/735 |
| 9,815,319 B2 | * | 11/2017 | Cooper | B44D 3/14 |

* cited by examiner

*Primary Examiner* — Jeffrey R Allen
(74) *Attorney, Agent, or Firm* — Richard K Thomson

(57) ABSTRACT

Several embodiments of a bucket claw that engages an upper rim of a 5-gallon bucket are presented. The claw includes a first L-shaped member and apparatus to secure the first L-shaped member to the bucket rim such that the horizontally extending arm of the member can support a sprayer attached to a hose for easy access.

5 Claims, 7 Drawing Sheets

BUCKET CLAW

The present application claims priority from provisional application Ser. No. 16/717,964 which is hereby incorporated by reference.

BACKGROUND AND SUMMARY OF THE INVENTION

The present invention is directed to a claw attachable to a five gallon bucket. More particularly, the present invention is directed to a claw that supports an arm that permits the bucket to support a hose or other article on the rim of the bucket.

The washing of a car, deck, house-siding or the like, requires repeated utilization of a hose, typically equipped with a sprayer that includes a shut-off valve. Frequently, a bucket with a broom or other applicator, is utilized to apply soapy water to the surface to be cleaned. Then, the sprayer is used to rinse the cleansed surface. If the hose, as is typically the case, is simply lying on the ground, this operation involves frequent bending to access the ground-engaged hose/sprayer. Repetitive bending can pose a risk to lower back muscles, and to thigh and calf muscles, as well.

It is among the objects of the present invention to eliminate the repeated stooping required to gather up the hose/sprayer. An L-shaped support or claw allows the sprayer to be draped over the horizontally extending arm portion to facilitate its being grasped and utilized to rinse the item being washed. An optional accessory allows the hose sprayer to be used in a hands-free mode so the user can be involved in washing, brooming or chamoising the vehicle.

Various other features, advantages, and characteristics of the present invention will become apparent after a reading of the following detailed description.

BRIEF DESCRIPTION OF THE DRAWINGS

The preferred embodiment(s) of the present invention are shown in the attached photos, and in which.

DETAILED DESCRIPTION OF THE PREFERRED EMBODIMENT(S)

Figure 1:
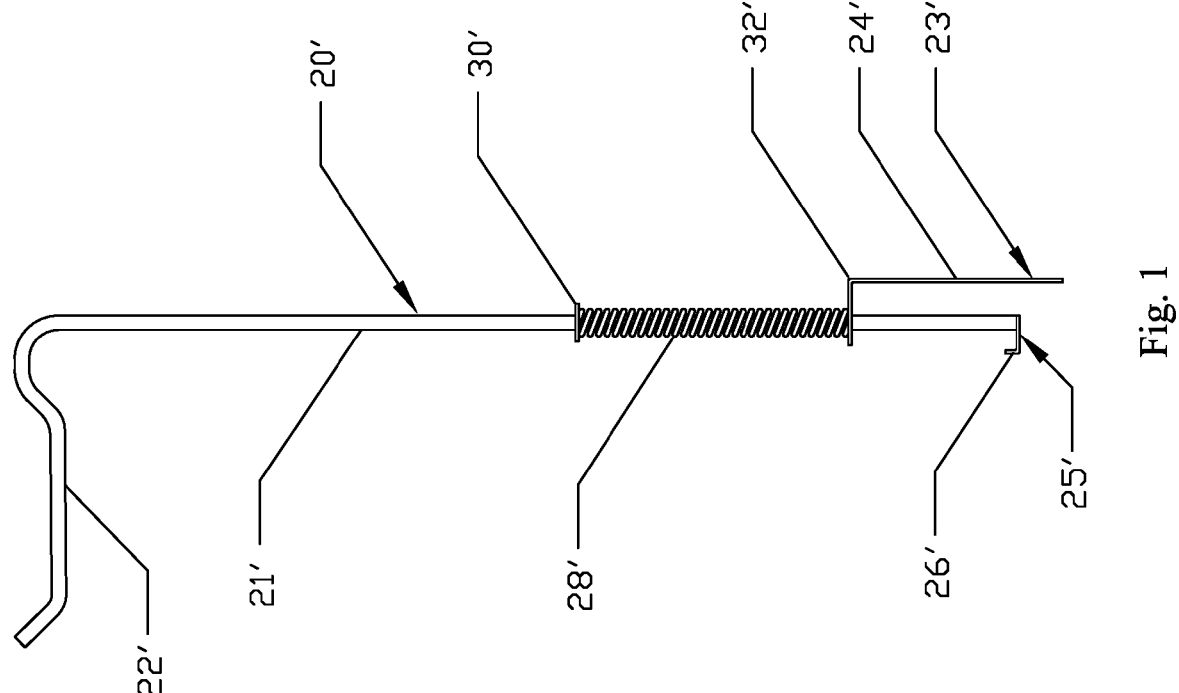
FIG. 1 is a front view of a first embodiment of the bucket claw of the present invention.
Figure 2:
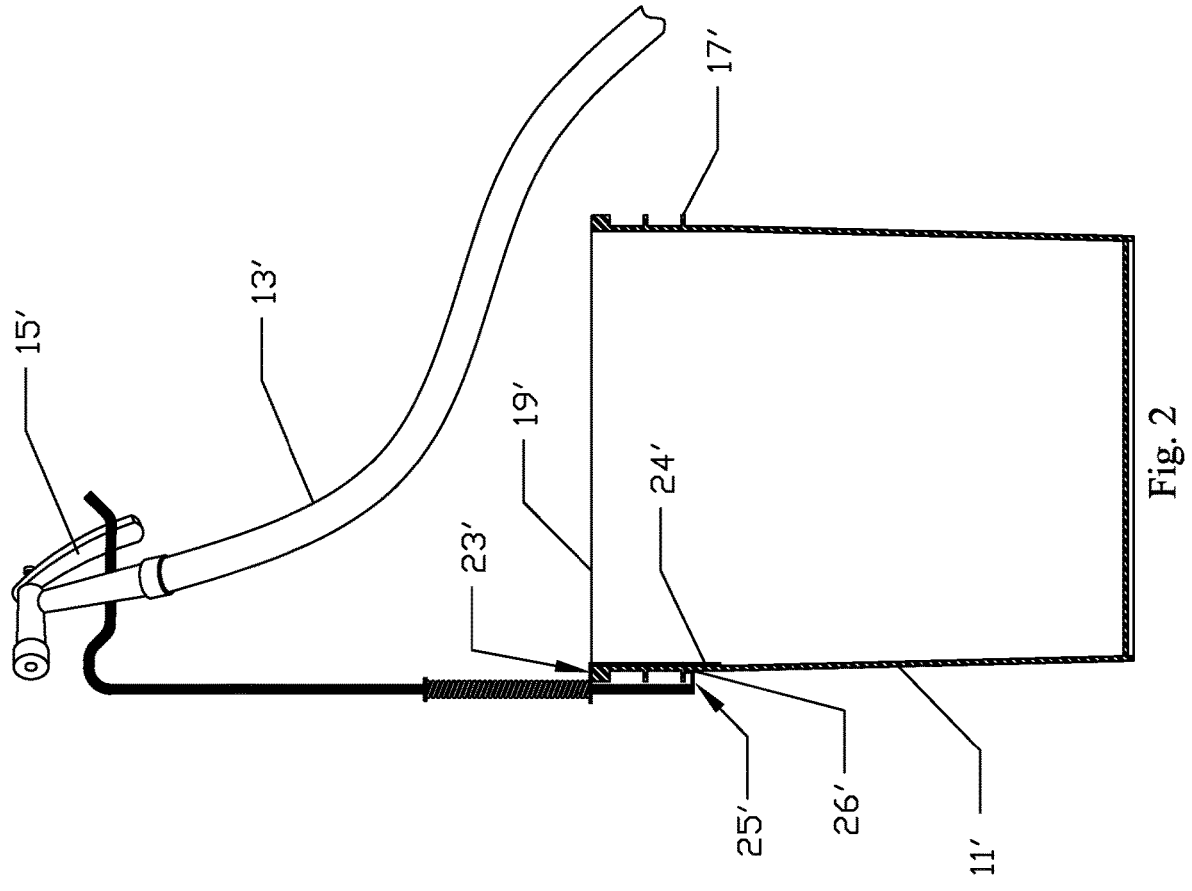
FIG. 2 is a front perspective view of the bucket claw of FIG. 1 shown mounted on the rim of a bucket supporting a hose/sprayer.
Figures 2A, 2B:
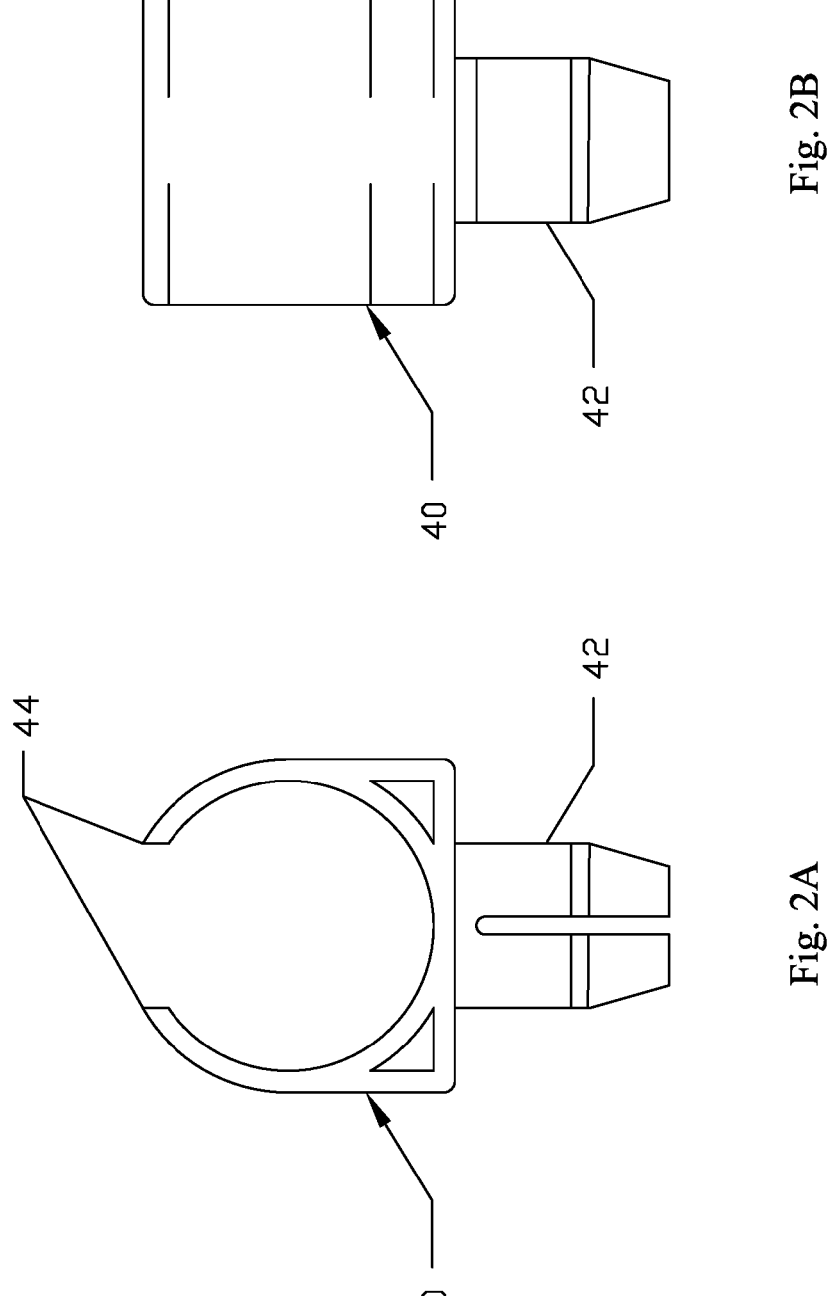
FIG. 2A is a bottom perspective view of an accessory of the second embodiment of bucket claw of the present invention.
FIG. 2B is a top perspective view of the accessory shown in FIG. 2A.

A first embodiment of the bucket claw of the present invention is depicted in FIGS. 1-2 generally at 20. As seen in these figures, the first embodiment 20' comprises a metal, generally L-shaped member having an elongated shank 21' upon which a spring 28' is mounted on a lower end thereof. Spring 28' is compressed between the bottom surface of an upper restraint 30' fixed to shank 21' and an upper surface 32' of a second L-shaped member 23'. As seen in FIG. 2, the arm 24' of second L-shaped member 23' extends downwardly and is received over the rim 19 of the bucket 11. A third L-shaped member 25' is positioned below the second on elongated shank 21' and has lip 26' which extends upwardly. To mount bucket claw 20' on the rim 19 of bucket 11, arm 24' is positioned over the rim 19 inside of bucket 11, arm 22' is rotated 180° from the position shown in FIG. 1, spring 28' compressed allowing lip 26' to be positioned below circumferential rib 17. When the pressure exerted against spring 28' is released, bucket claw 20' will be secured to bucket 11 allowing horizontally extending arm 22' of bucket claw 20' to support the trigger of the hose/sprayer 15 as seen in FIG. 2.

Figure 1A:
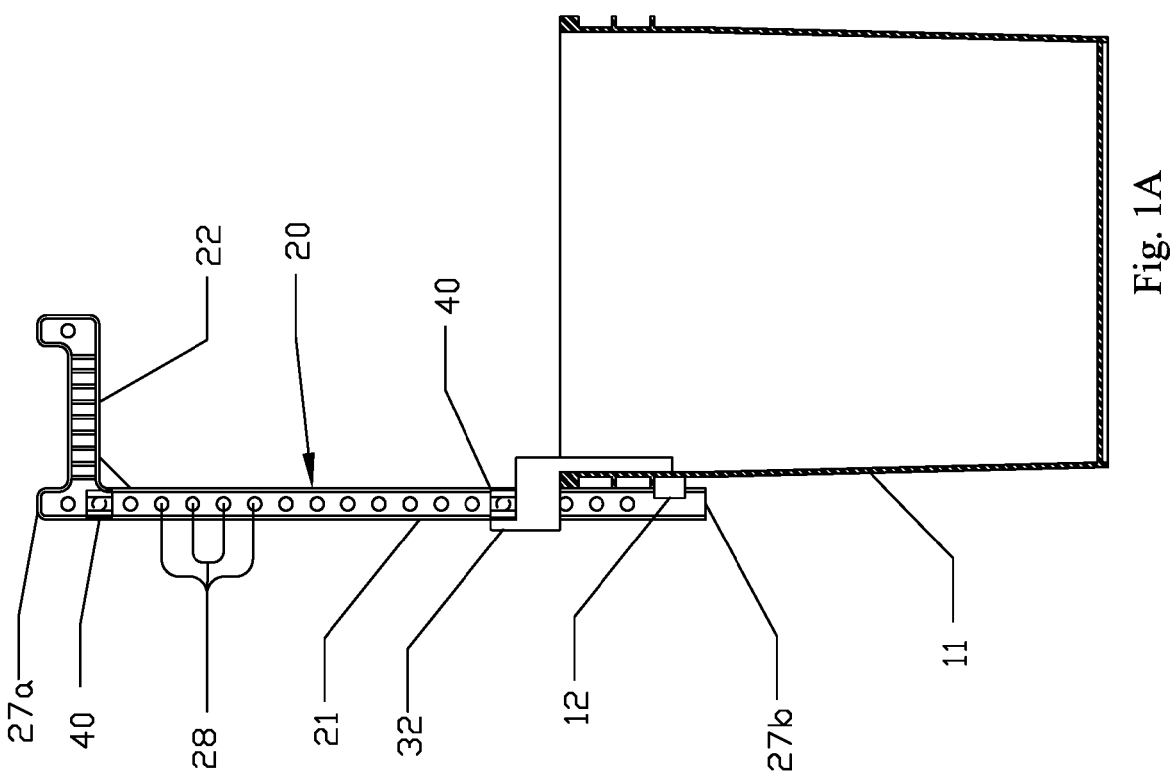
FIG. 1A is a front perspective view of a second preferred embodiment of the bucket claw of the present invention.
Figure 4:
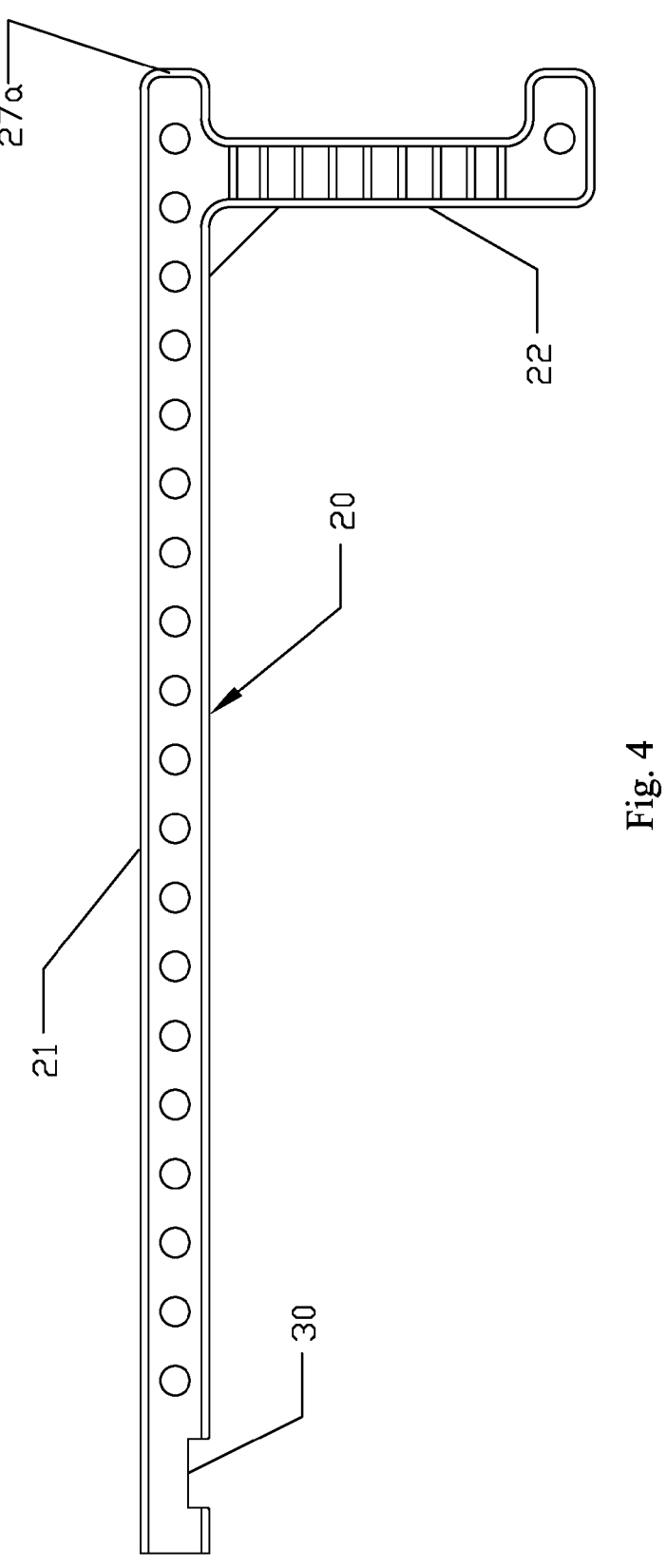
FIG. 4 is a front perspective view of the adjustable arm of the second embodiment of the bucket claw of the present invention.

A second embodiment of the bucket claw of the present invention is seen in FIG. 1A generally at 20. In this embodiment, first generally L-shaped member has a first elongated I-beam 21 having a plurality of holes 28 and a notch 30 near lower end 27b (FIG. 4). Notch 30 receives bail-mounting ear 12 on bucket 11 to help stabilize the claw 20 when mounted on bucket 11. The holes 28 in I-beam 23 reduce the amount of material needed to form it and, paradoxically, actually provide added beam strength to the member 23. Horizontally extending arm 22 extends from a position adjacent upper end 27a of elongated I-beam 21. Each of the elements of this embodiment are each preferably made of a durable plastic material.

Figures 3A, 3B:
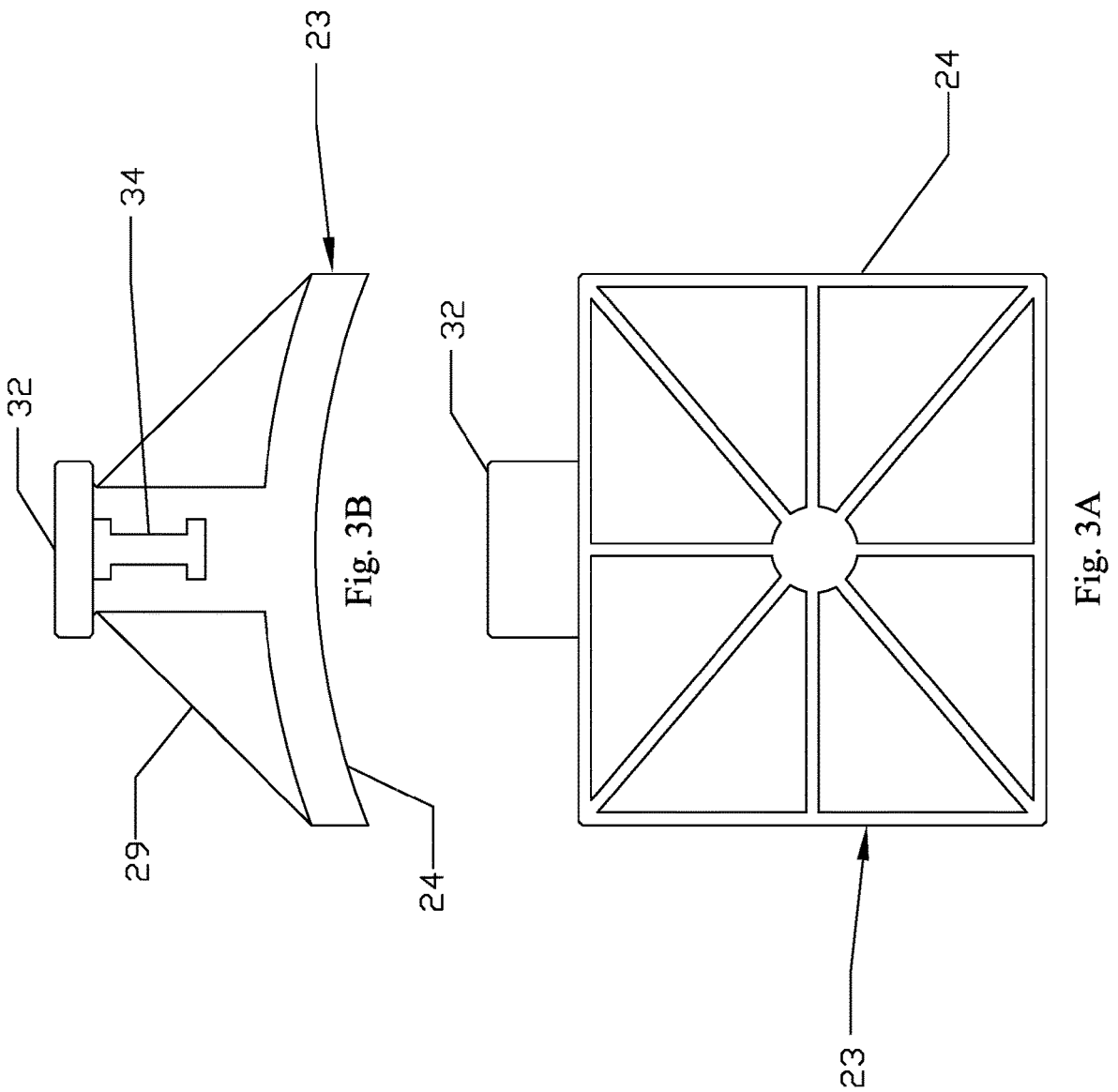
FIG. 3A a front perspective view of the clamping element of the second embodiment.
FIG. 3B is a rear perspective view of the clamping element of the second embodiment in an inverted position.

Second generally L-shaped member 23 is shown in greater detail in FIG. 3A (front view) and FIG. 3B (rear, inverted view). The vertically extending arm 24 has a slight radius to better configure to the radius of bucket 11. Further, orthogonally positioned arm 29 has an I-shaped through bore 34 accommodates I-beam 21 (FIG. 1A). Stabilizer arm 32 extends upwardly from on outer portion of arm 29 and engages the outer face of I-beam 21 to reduce relative movement between I-beam 21 and second L-shaped member 23. A pin/plug can be inserted into one of the holes 28 immediately above arm 29 to prevent relative movement between I-beam 21 and second L-shaped member 23.

In use, the sprayer 15 may be supported by horizontal arm 22, as in the case of the previous embodiment. Alternatively, an optional accessory 40 can be employed with post 42 being inserted in one of the holes 28 and spring arms 44 grasping the stem of sprayer 15. This allows sprayer to be activated by fixing the trigger in its depressed/on position. The user can target whatever region of the item being washed while s/he utilizes a rag, broom or chamois to simultaneously treat the region.

Figures 5, 6:
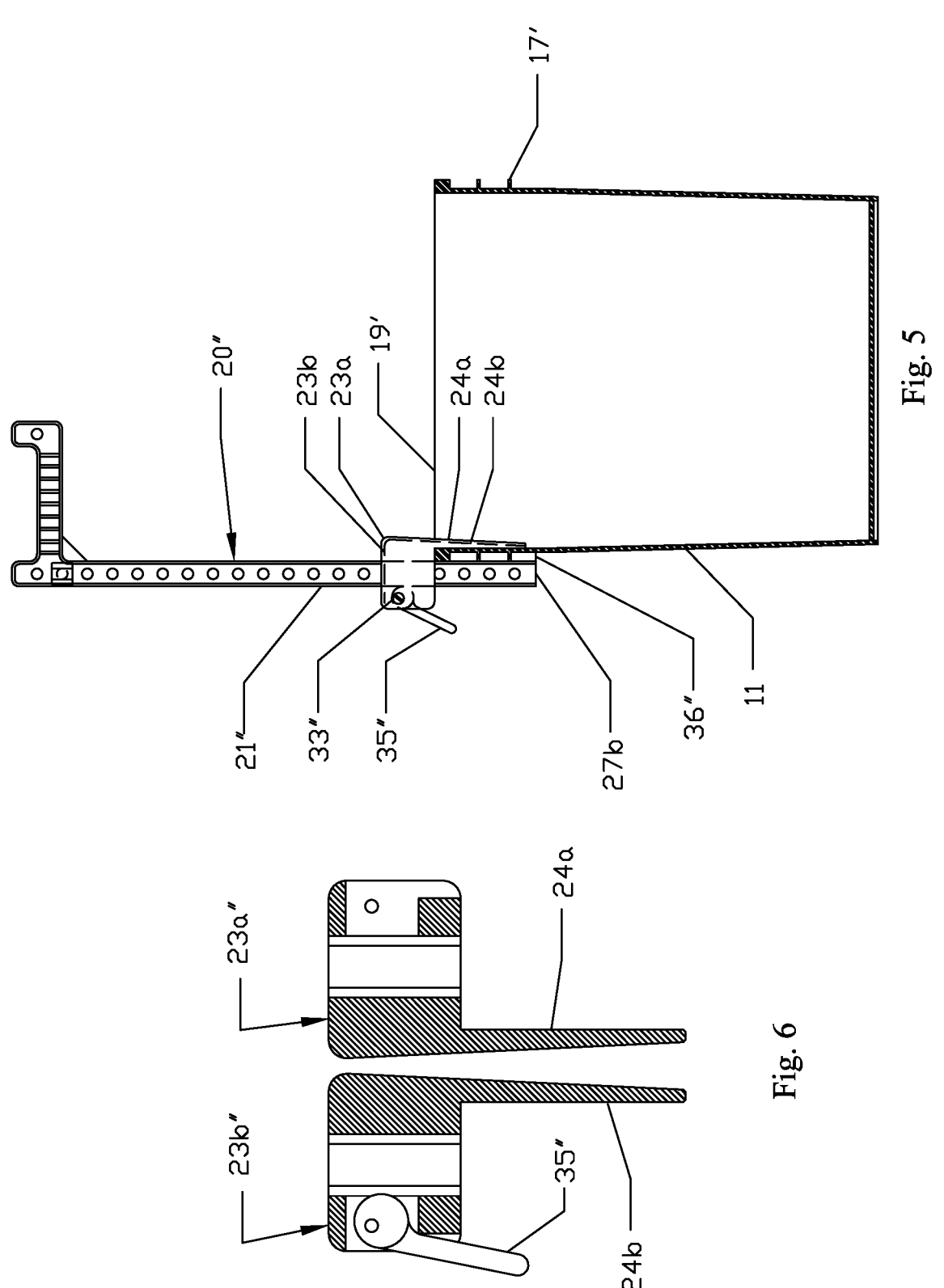
FIG. 5 is a perspective front view of a third embodiment of the present invention; and, FIG. 6 is a cross-sectional view of the clamshell elements of the third embodiment with the two clamshells splayed open.

A third embodiment of bucket claw of the present invention is depicted in FIGS. 5 and 6 generally at 20". In this embodiment, first and second clamshell members 23a" and 23b" capture I-beam 21". Each clamshell member 23a" and 23b" has a downwardly extending arm 24a" and 24b", respectively, which is received over the rim 19 of bucket 11, as were arms 24' and 24 of the previous two embodiments. The rim 19 of the bucket is clasped between downwardly extending arms 24a" and 24b", the body of clamshell members 23a" and 23b", and the I-beam 21". Stabilizing bar 36" is secured to the lower end 27b" to rest against the outer surface of bucket 11. A wheel cam (not shown) is mounted on screw 33" which holds clamshell members 23a" and 23b" together. Wheel cam engages the outermost surface of I-beam 21″. Lever arm 35″ operates wheel cam: when lever arm 35″ is raised, wheel cam is released and members 23a″ and 23b″ can move vertically, up or down, on I-beam 21″; pressing down on lever arm 35″ locks members 23a″ and 23b″ against movement relative to I-beam 21″.

While the figures herein depict the primary usage of bucket claw 20 of the present invention, it will be appreciated that other uses could be implemented, as well. For example, if the 5 gallon bucket were filled with sand, the bucket claw 20 could serve as a stabilizer for a beach umbrella that had its base buried in the sand in the bucket or immediately adjacent the edge of the bucket, if deeper penetration is required. The actual mode of this alternative usage will depend on the length of the umbrella pole and the laterally outward extent of the umbrella's reach.

Various changes, alternatives, and modifications will become apparent to a person of ordinary skill in the art after a reading of the foregoing specification. It is intended that all such changes, alternatives, and modifications as may be envisioned, be considered part of the present invention.

I claim:

1. A bucket claw member for supporting a hose sprayer relative to a bucket, said bucket claw comprising:
   a) a first L-shaped member having a first vertically extending arm and a second horizontally extending arm protruding from an upper end of said first vertically extending arm, said horizontally extending arm of said first L-shaped member being configured to extend above a rim of a 5-gallon bucket;
   b) first engagement means configured to engage an internal portion of the bucket, said first engagement means comprises a second generally L-shaped member secured to a lower end of said first L-shaped member and movable relative to said first L-shaped member;
   c) second engagement means configured to engage an external portion of the bucket, said first and second engagement means interacting to stabilize said horizontally extending arm of said first L-shaped member above the rim of the 5-gallon bucket;
   d) compressed spring biasing means engagable between a lower surface of an upper restraint fixed to said vertically extending arm of said first L-shaped members and an upper surface of said second generally L-shaped member forcing said lower surface of said upper restraint and said upper surface of said second generally L-shaped member apart to bring a third L-shaped member having an upwardly protruding lip into engagement with an external rib on the 5-gallon bucket to secure said bucket claw in position relative to said 5-gallon bucket.

2. A bucket claw member for supporting a hose sprayer relative to a bucket, said bucket claw comprising:
   a) a first L-shaped member having a first vertically extending arm and a second horizontally extending arm protruding from an upper end of said first vertically extending arm, said horizontally extending arm of said first L-shaped member being configured to extend above a rim of a 5-gallon bucket, said vertical arm of said first L-shaped member comprises an elongated I-beam with a plurality of holes extending through a web of said elongated I-beam, said vertical arm forming a second engaging means configured to engage an external portion of the bucket;
   b) a second L-shaped member secured to a lower portion of said elongated I-beam, said second L-shaped member having a horizontal arm with an I-shaped through-bore for receiving said I-beam, and a vertical arm forming a first engagement means configured to engage an internal portion of the bucket, said second L-shaped member further having at least one hole alignable with one of said plurality of holes of said vertical arm of said first L-shaped member;
   said first and second engagement means interacting to stabilize said horizontally extending arm of said first L-shaped member above the rim of the 5-gallon bucket.

3. The bucket claw member of claim 2 further comprising an accessory attachable to said elongated I-beam, said accessory having a post insertable into one of said plurality of holes in said elongated I-beam, said accessory further having a pair of spring fingers foor grasping a hose sprayer permitting hands-free use of the hose sprayer.

4. A bucket claw member for supporting a hose sprayer relative to a bucket, said bucket claw comprising:
   a) first engagement means formed by a pair of L-shaped clamshell members, each said clamshell member having a downwardly extending arm for engaging an inner portion of a 5 gallon bucket and a body portion which lies atop a rim of the bucket;
   b) a second engaging means formed by a third L-shaped member having a first vertically extending arm formed as an elongated I-beam with a plurality of holes extending through a web of said elongated I-beam and a second horizontally extending arm protruding from an upper end of said first vertically extending arm, said horizontally extending arm of said third L-shaped member being configured to extend above a rim of a 5-gallon bucket, a lower end of said vertically extending arm of said third L-shaped member forming a second engagement means configured to engage an external portion of the bucket forming with said downwardly extending arms of said clamshell members a clamp for the upper portion of the bucket.

5. The bucket claw member for supporting a hose sprayer relative to a bucket of claim 4, further comprising recesses in each of said L-shaped clamshell members to slidingly receive said downwardly extending arm of said second engaging means.

* * * * *